United States Patent
Krishnamoorthy et al.

(10) Patent No.: US 12,156,286 B2
(45) Date of Patent: Nov. 26, 2024

(54) UE SIM STATE NETWORK NOTIFICATIONS

(71) Applicant: QUALCOMM Incorporated, San Diego, CA (US)

(72) Inventors: Parthasarathy Krishnamoorthy, San Diego, CA (US); Ruiming Zheng, Beijing (CN); Ozcan Ozturk, San Diego, CA (US); Chetan Chakravarthy, San Diego, CA (US); Krishna Rao Mandadapu, San Diego, CA (US); Vijay Marwah, San Diego, CA (US); Mueez Ahmad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/763,846

(22) PCT Filed: Nov. 12, 2019

(86) PCT No.: PCT/CN2019/117372
§ 371 (c)(1),
(2) Date: Mar. 25, 2022

(87) PCT Pub. No.: WO2021/092741
PCT Pub. Date: May 20, 2021

(65) Prior Publication Data
US 2022/0295261 A1    Sep. 15, 2022

(51) Int. Cl.
*H04W 8/18*    (2009.01)
(52) U.S. Cl.
CPC .................. *H04W 8/18* (2013.01)
(58) Field of Classification Search
CPC ....................................................... H04W 8/18
See application file for complete search history.

(56) References Cited

U.S. PATENT DOCUMENTS

| 9,210,688 B2 | 12/2015 | Kanamarlapudi et al. |
| 9,338,713 B2 | 5/2016 | Chakravarthy et al. |

(Continued)

FOREIGN PATENT DOCUMENTS

| CN | 109076453 A | 12/2018 |
| WO | WO-2015051157 | 4/2015 |

(Continued)

OTHER PUBLICATIONS

International Search Report and Written Opinion—PCT/CN2019/117372—ISAEPO—Aug. 11, 2020.

(Continued)

*Primary Examiner* — Rasha S Al Aubaidi
*Assistant Examiner* — Jirapon Tulop
(74) *Attorney, Agent, or Firm* — Harrity & Harrity LLP/Qualcomm Incorporated

(57) ABSTRACT

A MSIM UE may perform various network operations for each network subscription. However, if the MSIM UE employs subscriptions for different network operators, the UE may need to periodically tune away for an active data transmission. Such tune-away may cause the UE to miss scheduled communications from the network. Aspects of the present invention are directed to a mechanism by which a UE can notify a base station of the MSIM state, and thereby allow the network to improve scheduling for the UE to allow for periodic tune-away by the UE with minimal impact on scheduled communications. In an aspect of the disclosure, a method, a computer-readable medium, and an apparatus are provided. The apparatus may by a UE, such as MSIM UE. The apparatus may be configured to determine that the UE is associated with one or more network subscriptions, and transmit a subscription indication to a network device, wherein the subscription indication identifies a subscription state of the UE to the network.

30 Claims, 9 Drawing Sheets

(56) References Cited

U.S. PATENT DOCUMENTS

| | | |
|---|---|---|
| 9,860,750 B2 | 1/2018 | Goel et al. |
| 2016/0142087 A1* | 5/2016 | Inampudi .............. H04W 48/16 |
| | | 455/558 |
| 2016/0353516 A1 | 12/2016 | Rajurkar et al. |
| 2017/0150545 A1* | 5/2017 | Ramkumar ........... H04W 8/082 |
| 2018/0368107 A1* | 12/2018 | Babaei ................. H04L 1/1838 |
| 2019/0053130 A1 | 2/2019 | Guo et al. |
| 2019/0223132 A1 | 7/2019 | Miao et al. |
| 2021/0282103 A1 | 9/2021 | Zhu |

FOREIGN PATENT DOCUMENTS

| | | | |
|---|---|---|---|
| WO | WO-2015126842 A1 | 8/2015 | |
| WO | WO-2017083324 A1 | 5/2017 | |
| WO | WO-2017128642 A1 * | 8/2017 | ........... H04B 7/0626 |
| WO | WO-2018078503 A1 | 5/2018 | |
| WO | WO-2019212181 A1 * | 11/2019 | ........... H04L 1/0063 |

OTHER PUBLICATIONS

VIVO (Moderator): "Report of Phase 1 Multi-SIM Email Discussion", 3GPP Draft, 3GPP TSG-RAN WG Meeting #85, RP-191898, Newport Beach, USA, Sep. 16-20, 2019, Sep. 20, 2019 (Sep. 20, 2019), 36 Pages, The whole document.
Supplementary European Search Report—EP19952286—Search Authority—The Hague—Jul. 3, 2023.

* cited by examiner

UE SIM STATE NETWORK NOTIFICATIONS

BACKGROUND

Technical Field

The present disclosure relates generally to communication systems, and more particularly, to status indications for MSIM devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple access technologies have been adopted in various telecommunication standards to provide a common protocol that enables different wireless devices to communicate on a municipal, national, regional, and even global level. An example telecommunication standard is 5G New Radio (NR).

5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

A Multiple Subscriber Identify Module (MSIM) capable User Equipment (UE) may operate in a connected mode on a first subscription with a first network while operating in an idle mode or an active mode on a second subscription. The MSIM UE may perform various network operations for each network subscription. However, if the MSIM UE employs subscriptions for different network operators, the UE may need to periodically tune away to a second network frequency from an active data transmission on a first network frequency. Such a tune-away may cause the UE to miss scheduled communications with the first network. Aspects of the present invention are directed to a mechanism by which a UE can notify a first network base station that the UE is a MSIM device and thereby allow the network to improve scheduling for the UE to account for periodic tune-away by the UE with minimal impact to the scheduled communications.

In an aspect of the disclosure, a method, a computer-readable medium, and an apparatus are provided. The apparatus may by a UE, such as a multi-SIM UE. The apparatus may be configured to determine that the UE is associated with one or more network subscriptions, and transmit a subscription indication to a network device, wherein the subscription indication identifies a subscription state of the UE to the network. The apparatus may be further configured to receive a query from the network to trigger transmission of the subscription indication from the UE. The apparatus may transmit the subscription indication in response to an uplink grant or in response to an activation or deactivation of a network subscription. The apparatus may be further configured to determine, for each subscription of the one or more network subscriptions, whether to transmit a subscription indication based on whether a given network subscription corresponds to a same network as another network subscription from the plurality of network subscriptions. The subscription indication indicates a SIM state of the UE as one of Single-SIM, Dual-SIM-Dual-Standby, or Dual-SIM-Dual-Active. The subscription indication may be transmitted in a MAC CE. Additionally, apparatus may be further configured to determine that the one or more subscriptions have been activated or deactivated at the UE, and transmit another subscription indication to a network device in response to the determining that the one or more subscriptions have been activated or deactivated at the UE.

In another aspect of the disclosure, a method, a computer-readable medium, and an apparatus are provided. The apparatus may by a network device. The apparatus may be configured to transmit an uplink grant to a user equipment (UE), and receive a subscription indication from the UE, wherein the subscription indication identifies a current SIM state of the UE to the network. The apparatus may be further configured to transmit a query to the UE to trigger transmission of the subscription indication from the UE. The uplink grant is transmitted to trigger the UE to send the subscription indication. The subscription indication indicates an activation or deactivation of a network subscription at the UE. The subscription indication from the UE may also indicate whether a plurality of active subscriptions are associated with a same radio access network. The subscription indication may also, or alternatively, indicate a SIM state as one of Single-SIM, Dual-SIM-Dual-Standby, or Dual-Sim-Dual-Active.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
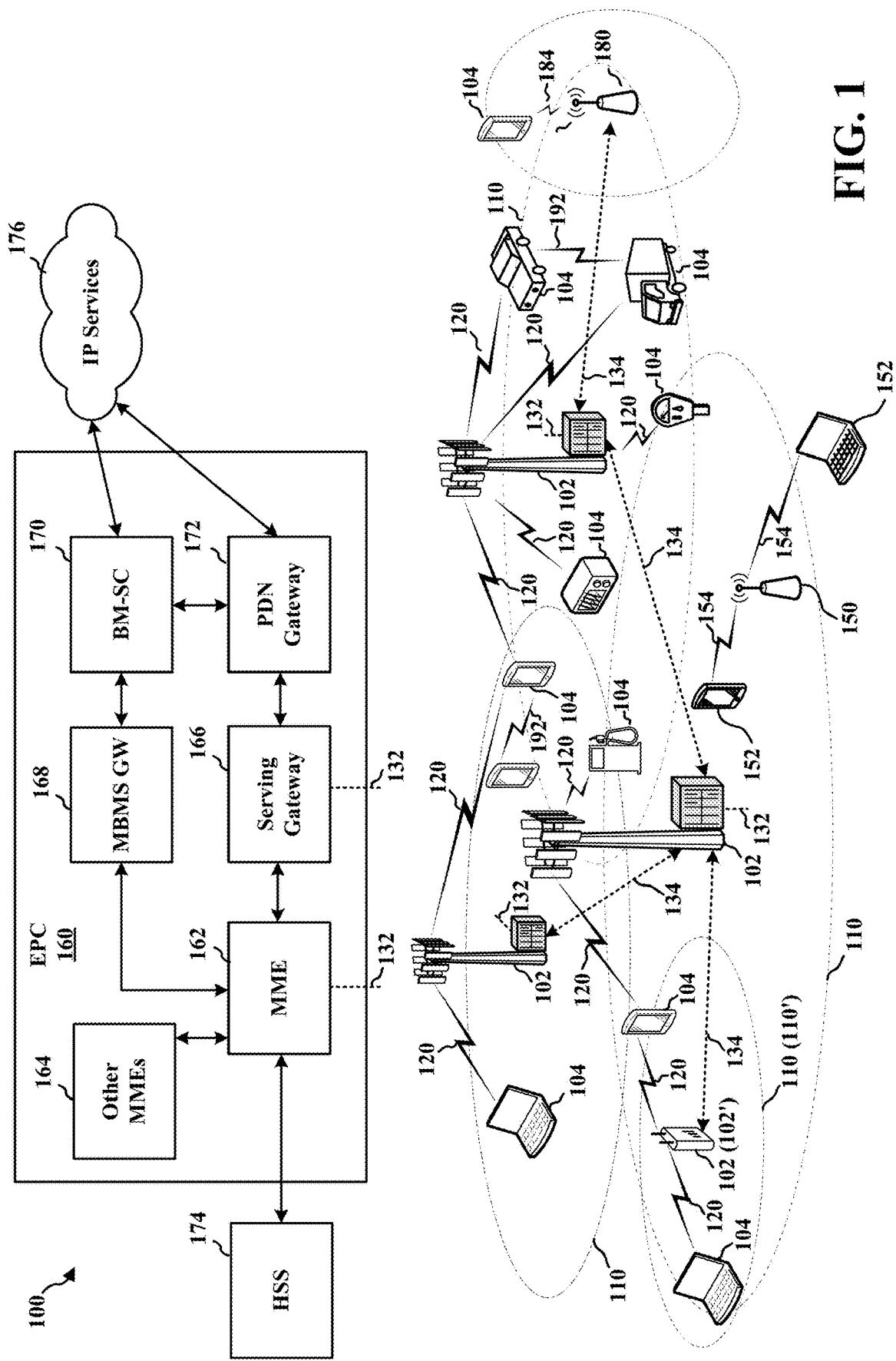
FIG. 1 is a diagram illustrating an example of a wireless communications system and an access network according to some embodiments.

The detailed description set forth below in connection with the appended drawings is intended as a description of various configurations and is not intended to represent the only configurations in which the concepts described herein may be practiced. The detailed description includes specific details to provide a thorough understanding of various concepts. However, it will be apparent to those skilled in the art that these concepts may be practiced without these specific details. In some instances, well-known structures and components are shown in block diagram form to avoid obscuring such concepts.

A MSIM UE may operate in a connected mode on a first subscription with a first network while operating in an idle mode or an active mode on a second subscription. The MSIM UE may need to perform various recurrent network operations on each network. However, if the MSIM UE employs subscriptions for different network operators, the UE may need to periodically tune away from a first network frequency engaged in active data transmission to a second network to perform channel measurements and/or monitor for communications (e.g., pages, wake-up signals, etc.). Such a tune-away may cause the UE to miss scheduled communications on the first network. Aspects of the present invention are directed to a mechanism by which a UE can notify a first network base station that the UE is MSIM device, and thereby allow the network to improve scheduling for the UE to account for periodic tune-away by the UE with minimal impact to the scheduled communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), Inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., an X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase the capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a prosthetic, medical device, entertainment device, industrial equipment, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
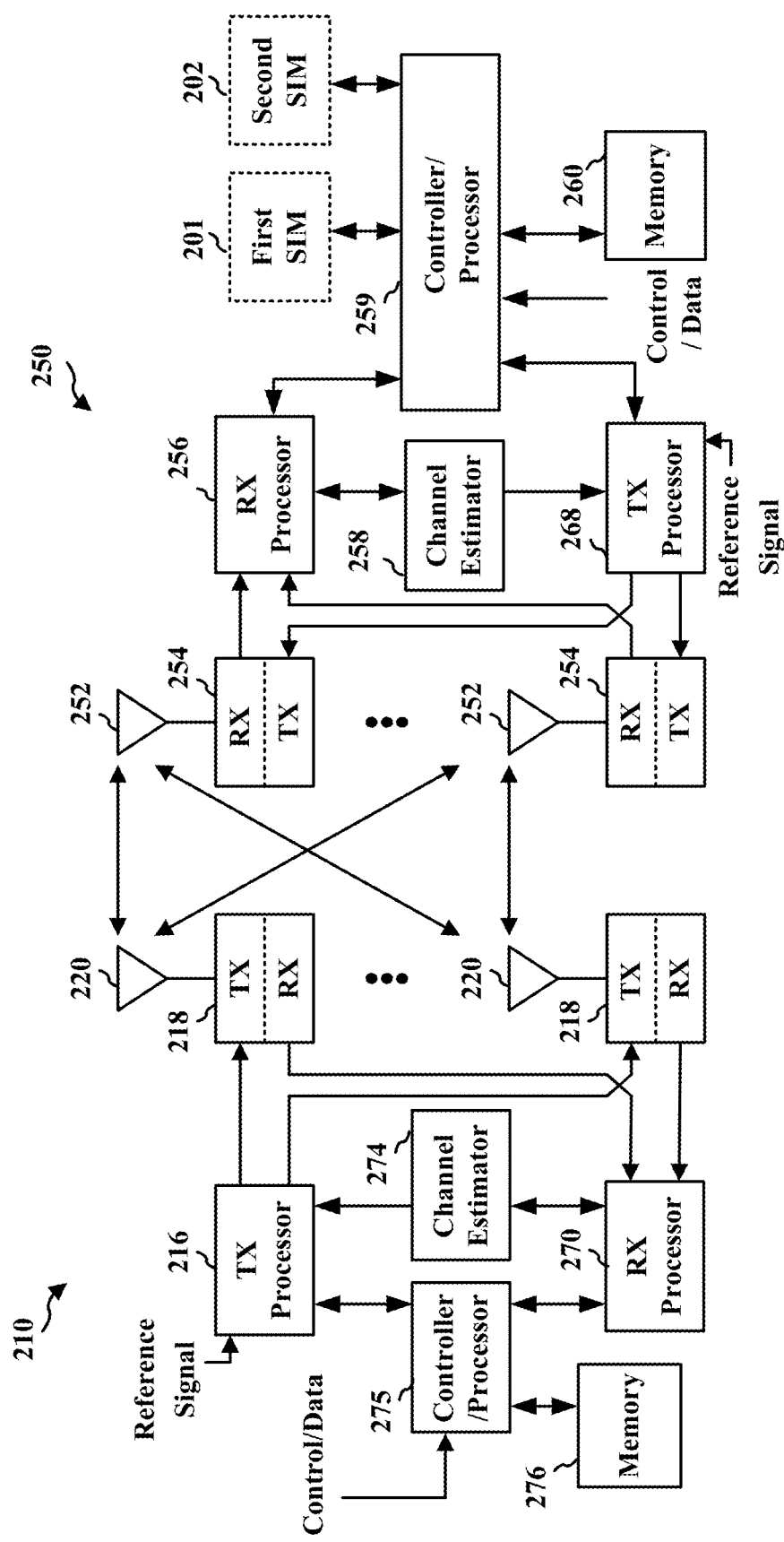
FIG. 2 is a diagram illustrating an example of a base station and user equipment (UE) in an access network according to some embodiments.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 2 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission.

The UL transmission is processed at the base station 210 similarly to the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

Various wireless communication technologies may have a different frame structure and/or different channels. A frame may be divided into multiple (e.g., 10) equally sized subframes. Each subframe may include multiple consecutive time slots (based on the type of numerology). A resource grid may be used to represent time slots, each time slot may include one or more time concurrent resource blocks (RBs) (also referred to as physical RBs (PRBs)). The resource grid is divided into multiple resource elements (REs). For a normal cyclic prefix, an RB may contain consecutive subcarriers in the frequency domain and consecutive symbols The number of bits carried by each RE depends on the modulation scheme.

Some of the REs may carry reference (pilot) signals (RS) for downlink channel estimation at the UE. These RS may include cell-specific reference signals (CRS) (also sometimes called common RS), UE-specific reference signals (UE-RS), and channel state information reference signals (CSI-RS).

Various channels may exist within a DL subframe. The PDCCH carries downlink control information (DCI) within one or more control channel elements (CCEs), each CCE including multiple RE groups (REGs), each REG including a number of consecutive REs in an OFDM symbol. A UE may be configured with a UE-specific enhanced PDCCH (ePDCCH) that also carries DCI. The physical hybrid automatic repeat request (ARQ) (HARQ) indicator channel (PHICH) carries the HARQ indicator (HI) that indicates HARQ acknowledgement (ACK)/negative ACK (NACK) feedback based on the success of decoding a physical uplink shared channel (PUSCH). A primary synchronization signal (PSS) may serve to determine subframe/symbol timing and a physical layer identity. A secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the downlink RS. A physical broadcast channel (PBCH), carries a master information block (MIB). The PBCH may be logically grouped with the PSS and SSS to form a synchronization signal (SS) block. The MIB provides system configuration information, including a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

Uplink subframes may include REs that carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

A physical random access channel (PRACH) may be within one or more subframes within a frame based on the PRACH configuration. The PRACH may include consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

A wireless communication device may include one or more subscriber identity modules (SIMs) that provide access to one or multiple separate mobile communication networks that implement certain radio access technologies (RATs).

Example UEs include, but are not limited to, mobile phones, laptop computers, smart phones, and other mobile communication devices of the like that are configured to connect to one or more RATs. These devices may have Multiple Subscriber Identity Module (MSIM) capability. FIG. 2, for example illustrates a UE having multiple SIMs (e.g., a first SIM 201 and a second SIM 202). Although two SIMs are illustrated, aspects described herein may be similarly applied to a device comprising more than two SIMs. Having multiple SIMs may enable a single device to use different numbers for voice calls. Multiple SIMs may enable the device to operate using more than one network subscription and/or more than one network. Such a wireless communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), 5G New Radio (NR), Global System for Mobility (GSM), and Wideband Code Division Multiple Access (WCDMA)). To use different frequency systems and/or radio access technologies, a wireless communication device may include two or more radio transceivers.

As noted, a SIM enables the wireless communication device to access one or more communication networks (or one or more subscriber accounts on the same network). A SIM card may identify and authenticate a subscriber using a particular communication device, and the SIM card may be associated with a subscription. In various embodiments, the wireless communication device may also include one or more RF resource chains that may each be used for RF reception and transmission. As used herein, the terms "SIM," "SIM card," "subscriber identity module," and variants thereof are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information stored in a particular SIM, as the SIM and the communication network (as well as the services and subscriptions supported by that network) correlate to one another. Similarly, the term "subscription" may refer to a network subscription or service associated with a particular SIM.

In general, a wireless device that includes multiple SIMs and can be connected to two or more separate (or same) RATs using a same set of transmission hardware (e.g., radio frequency (RF) transceivers) is a multi-SIM-multi-standby (MSMS) communication device. In one example, the MSMS communication device may be a dual-SIM-dual-standby (DSDS) communication device, which may include two SIM cards/subscriptions that may both be active on standby, but one is deactivated when the other one is in use. In another example, the MSMS communication device may be a triple-SIM-triple-standby (TSTS) communication device, which includes three SIM cards/subscriptions that may all be active on standby, where two may be deactivated when the third one is in use. In other examples, the MSMS communication device may include other suitable MSIM communication devices, with, for example, four or more SIMs, such that when one is in use, the others may be deactivated.

Alternatively, a wireless device with multiple SIMs that can connect to two or more separate (or same) RATs using two or more separate sets of transmission hardware is termed a multi-SIM-multi-active (MSMA) communication device. An example MSMA communication device is a dual-SIM-dual-active (DSDA) communication device, which includes two SIM cards/subscriptions. Both SIMs may remain active. In another example, the MSMA device may be a triple-SIM-triple-active (TSTA) communication device, which includes three SIM cards/subscriptions. All three SIMs may remain active. In other examples, the MSMA communication device may include other suitable MSIM communication devices with four or more SIMs, which may all be active.

Various aspects and embodiments described herein relate to, but are not limited to, a MSIM context such as the MSMS and MSMA contexts. For example, in the MSIM context, each subscription may be configured to acquire service from a base station (associated with a given cell). For clarity, various aspects and embodiments described herein refer to a MSIM UE with two subscriptions. However, various aspects and embodiments described herein can relate to MSIM UEs with three or more SIMs and three or more subscriptions.

By example, a typical MSIM device may include a MSIM UE. Such a UE may be a 5G+5G MSIM device (including two 5G SIMs corresponding to two 5G subscriptions). In a common scenario, a MSIM UE may be configured with two SIMs for the same operator or a different operator. That is, the two SIMs may correspond to the same network operator (Intra-PLMN) or correspond to different network operators (Inter-PLMN). A UE configured with two SIMs (i.e., two network subscriptions), regularly monitors for pages and channel quality for both networks (i.e., both network subscriptions). For example, when the MSIM device has single Rx capability (e.g., a signal receiver (SR)-DSDS device) and one of the subscriptions is active (e.g., engaged in data call), the UE will periodically tune away to the second subscription to perform an SSB measurement and page monitoring. In the Intra-PLMN scenario, it may be possible to avoid tune away through implementation techniques. For example, the UE may detect that it is configured as Intra-PLMN and configure the non-active subscription with measurements from the active subscription. Similarly, the UE may be configured to monitor for pages on both subscriptions regardless of the active subscription. Furthermore, actual tune-away can be avoided since both subscriptions will operate on the same frequencies, allowing for channel measurement and page monitoring regardless of the active subscription.

For an Inter-PLMN MSIM UE, the UE will monitor SSBs on a second network (or second subscription) by performing a tune-away to the second network. Conventionally, when the UE tunes away to the second subscription, the scheduled transmissions on the first network (i.e., first subscription) are interrupted. That is, even if the network schedules data for the first network (i.e., first subscription), the UE will not be able to receive the data or acknowledge the data when monitoring the second network. These tune-aways will impact network statistics for the UE, and the network may ultimately penalize the UE for failing to acknowledge transmissions. Such penalizing may take the form of deprioritizing the UE on the first network and reducing throughput to the UE.

Thus, the first network with the active subscription (e.g., active data call) may ensure data is not scheduled during the SSB slots for those MSIM UEs (because tune-away primarily coincides with SSB slots for channel measurement). Since a typical 5G network could comprise of a variety of devices, such as Single SIM, DSDS, DSDA (including single Rx or dual Rx capability), etc., the 5G networks may not employ a blind decision to avoid scheduling PDSCH on SSB slots for all UEs, as this would lead to heavy capacity loss for the entire 5G cellular network. Accordingly, there exists a need to develop a standards level solution to address the specific situation of tune-away of MSIM devices that does not penalize the MSIM device. Accordingly, it becomes beneficial to provide a mechanism for the UE to indicate a current SIM state to the network, so that the network can efficiently schedule data to the MSIM UEs and facilitate the 5G tune away.

Aspects of the invention relate to the introduction of two new MAC Control Elements (CEs). These MAC CEs include a SIM State Query downlink MAC CE and a SIM State Response uplink MAC CE. The latter MAC CE may include a unique logical channel Identifier (LCID) identifying the MSIM state of the UE. That is, the network may query for the current SIM State using the SIM State Query MAC CE and UE may respond with a SIM State Response MAC CE containing a value corresponding to the SIM State of the UE. These values could be, for example, 0 for "SS" or 1 for "DSDS" or 2 for "DSDA", etc.) Alternatively, or additionally, the UE could autonomously send a current SIM State via SIM State Response whenever it has an uplink grant (without the network querying for the current SIM state). Additionally, the UE could update the network with an updated SIM state autonomously whenever the UE SIM state changes (e.g., if a user disables a SIM or moves out of network range).

As the SIM State Query and a SIM State Response are both MAC-CEs, they can be independent of a specific cell and/or beam. Furthermore. the transmission size can be relatively small (e.g., an octet) and the frequency of transmissions will be low. Hence, impact on the network capacity may be minimal.

Internal UE software modules may monitor the status of the SIMs (e.g, SIM 1 and SIM 2) in the UE and may transmit an updated SIM state to the networks associated with the active subscriptions, either autonomously or, alternatively, based upon whether a SIM State Query is received for each network. In the case of an Intra-PLMN MSIM UE, the UE could transmit a single network update if the network can monitor which SIMs occupy the same UE. Conversely, in the case of an Inter-PLMN MSIM UE, the UE may need to update each network independently.

For purposes of explanation and unless indicated otherwise, further reference to a MSIM UE will be directed to an example using a MSIM Inter-PLMN UE. The MSIM UE may be a 5G+5G MSIM Inter-PLMN UE including a first SIM and a second SIM. Furthermore, reference will be made to a first subscription or first network associated with the first SIM and a second subscription or second network associated with the second SIM. The first subscription is associated with the first cellular network and the second subscription is associated with the second cellular network. While reference hereinafter is made to a MSIM device, the described concepts are equally applicable to MSIM Intra-PLMN devices, and MSIM devices have three or more active SIMs and subscriptions.

Figure 3:
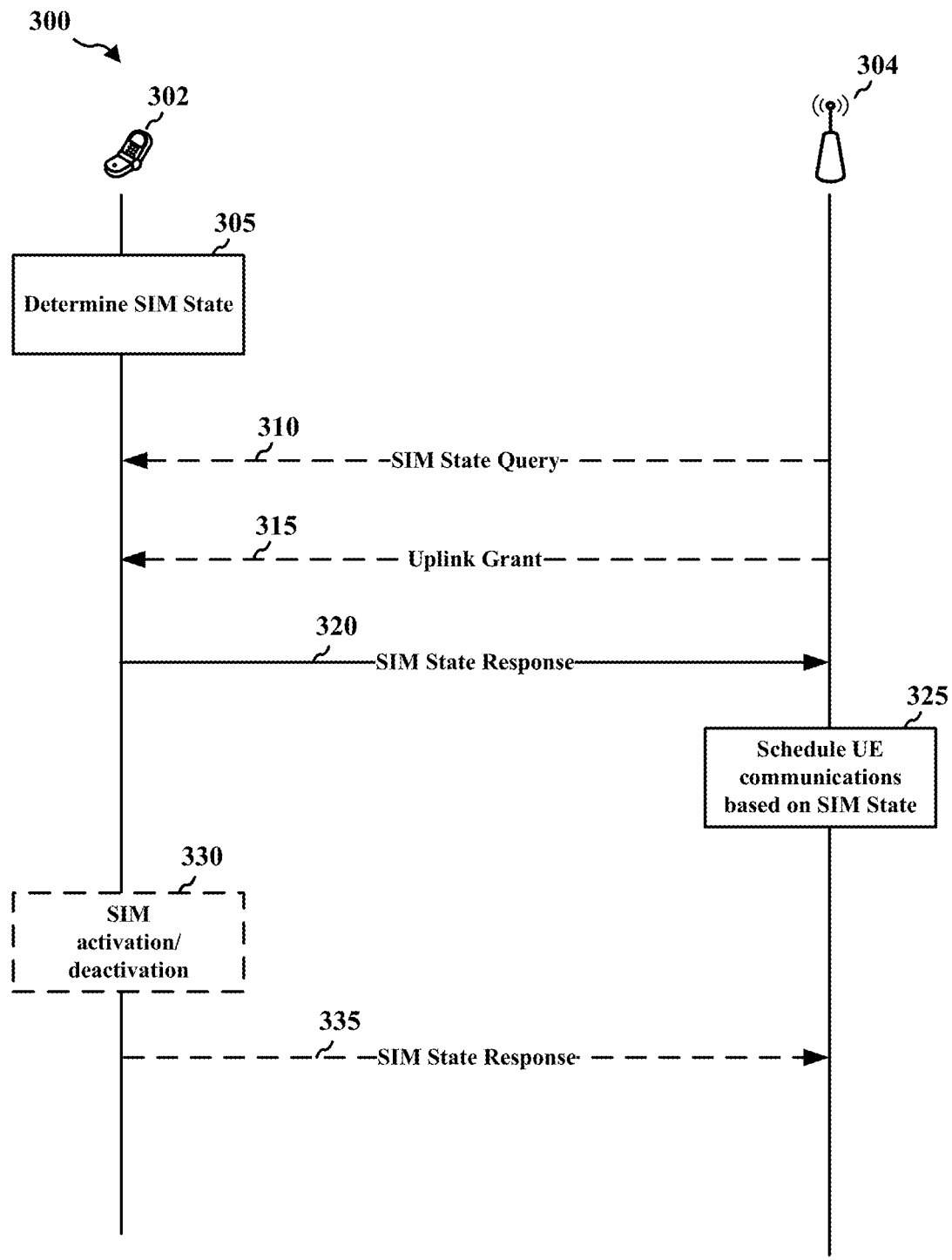
FIG. 3 is a communication diagram 300 illustrating signaling and operations performed by a UE and a base station according to some embodiments.

FIG. 3 is a communications diagram 300 illustrating signaling and operations performed by a UE 302 and a base station 304. Base station 304 may be a gNB or may represent various network elements communicating with UE 302. UE 302 may be a MSIM UE. The communications diagram 300 illustrates an aspect of the invention, whereby the MSIM communications employ network signaling optimizations that accommodate the MSIM Inter-PLMN state of the UE 302. Dashed lines represent optional features and steps. The steps presented in communications diagram 300 may be performed on each active network subscription (i.e., on each network on which the UE has an active subscription).

At 305, the UE 302 may determine the SIM State. For example, the UE 302 may identify which SIMs are active and/or correspond to active subscriptions. Based on the active SIMs and the radio capability and other factors, the UE 302 may identify its SIM state. The SIM State may correspond to SS, DSDS, DSDA, SR-DSDS, etc. Each SIM State may correspond to an index value which the UE 302 can communicate to the base station 304 using the SIM State Response MAC CE.

At 310, the base station 304 may transmit a SIM State Query to the UE 302. The SIM State Query may be a downlink MAC CE to trigger a SIM State Response from the UE 302. In alternative aspects, the SIM State Query may be transmitted as an RRC Information Element (IE) or DCI.

At 315, the base station 304 may transmit an uplink grant to the UE 302. The uplink grant may or may not include the SIM State Query. For example, the SIM State Query 310 and Uplink grant 315 may be combined in a single message.

At 320, the UE 302 may transmit a SIM State Response to the base station 304. The SIM State Response may be an uplink MAC CE. In alternative aspects, the SIM State Response may be transmitted as an RRC IE or UCI. Additionally, the SIM State Response may be transmitted in response to receiving the SIM State Query, the uplink grant, or may be triggered autonomously by the UE 302. The UE 302 may autonomously trigger a transmission of a State Response based on a timer, upon attaching to a base station, after SIM activation/deactivation, or if the UE 302 moves out of network for an active subscription. The SIM State may include states such as Single SIM, DSDS, DSDA, etc. Additionally, the SIM State may indicate whether the active SIMs are Intra-PLMN or Inter-PLMN.

At 325, the base station 304 may schedule communication with UE 302 based on the SIM State indicated in the SIM State Response 320. For example, if UE 302 indicates a DSDS state (or similar) the base station 304 may not schedule PDSCH on SSB slots. This will allow UE 302 to tune away during SSB slots to measure channel quality on a different network or frequency. Similarly, base station 304 may schedule periodic gaps in PDSCH transmissions to allow UE 302 to monitor for pages on a different network or frequency, without missing scheduled downlink transmissions.

At 330, the UE 302 may detect the activation or deactivation of a SIM. This may result from a user manually removing or inserting a SIM, due to a software activating or deactivating a SIM, or when the UE 302 moves out-of-network from a network area associated with an installed SIM.

At 335, the UE 302 may transmit a SIM state response to the base station 304 in response to the SIM activation or deactivation at 330. This SIM state response may be the same or similar to the SIM state response 320 and indicate the SIM activation or deactivation at 330. In some aspects, the UE 302 may transmit the SIM State Response at the next uplink opportunity, after receiving an uplink grant, or after receiving a SIM State Query from the base station 304.

Figure 4:
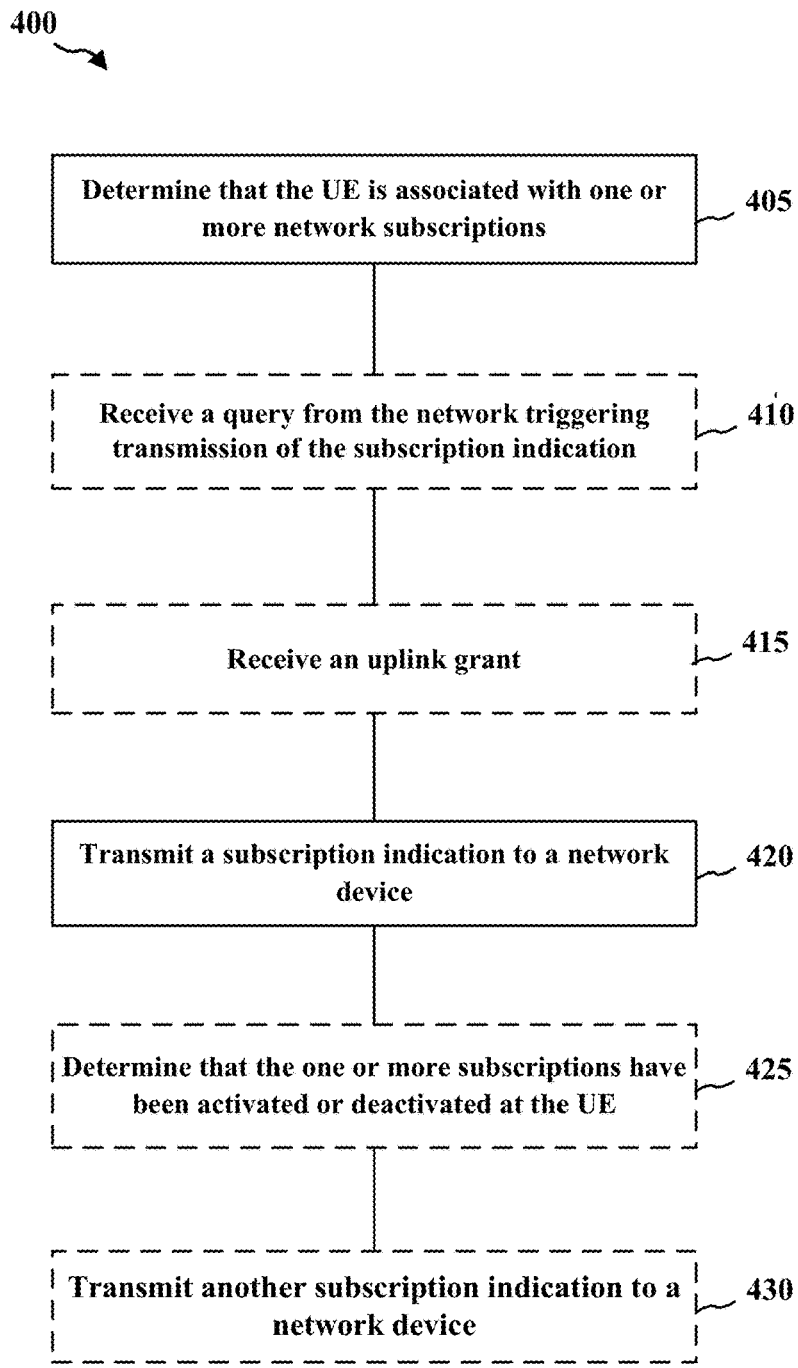
FIG. 4 is a flowchart of a method of wireless communication according to some embodiments.

FIG. 4 is a flowchart 400 of a method of wireless communication. The method may be performed by a UE (e.g., the UE 104, 250, 302; the apparatus 502/502'). The UE may be a MSIM Inter-PLMN UE. Optional aspects are illustrated with a dashed line. The method improves communication by a MSIM device by improving signaling throughput and reducing error rates. In an aspect, the steps in flowchart 400 may be performed for each active network subscription associated with the UE.

At 405, the UE may determine that the UE is associated with one or more network subscriptions. For example, as illustrated at 305 in FIG. 3, the UE may determine the SIM State of the UE. That is, the UE may identify each active subscription (i.e. active SIM) and determine the SIM State based on the active subscriptions and the radio capability of the UE. Additionally, the SIM state may be based on other factors (e.g., battery state, channel quality, etc.).

At 410, the UE may receive a query from the network for triggering the transmission of the subscription indication. For example, as illustrated at 310 in FIG. 3, the UE may receive a SIM State Query from a base station. The SIM State Query may be included in a DCI, MAC CE, or RRC IE.

At 415, the UE may receive an uplink grant. For example, as illustrated at 315 in FIG. 3, the base station may transmit an uplink grant to the UE.

At 420, the UE may transmit a subscription indication to a network device. The subscription indication may be transmitted in a MAC CE, and may comprise an octet of the MAC CE. In a first aspect, the UE may transmit the subscription indication in response to an uplink grant and/or the SIM State Query. Alternatively, the UE may autonomously determine to transmit the subscription indication. For example, as illustrated at 320 in FIG. 3, the UE may transmit a SIM State Response to the base station. Additionally, the subscription indication may indicate whether a plurality of active subscriptions at the UE are associated with a same radio access network or different radio networks. The subscription indication may indicate a SIM state including at least one of Single-SIM, Dual-SIM Dual-Standby, or Dual-Sim Dual-Active.

At 425, the UE may determine that the one or more subscriptions have been activated or deactivated at the UE. For example, as illustrated at 330 in FIG. 3, the UE may detect a SIM activation or deactivation. Subscriptions may be activated or deactivated based on user activity (manual SIM installation or removal), software activation or deactivation of SIMs, or due to UE mobility (e.g., UE moves out of network coverage).

At 430, the UE may transmit another subscription indication to a network device. For example, as illustrated at 335 in FIG. 3, the UE may transmit a second SIM State Response due to the activation or deactivation of subscriptions.

Figure 5:
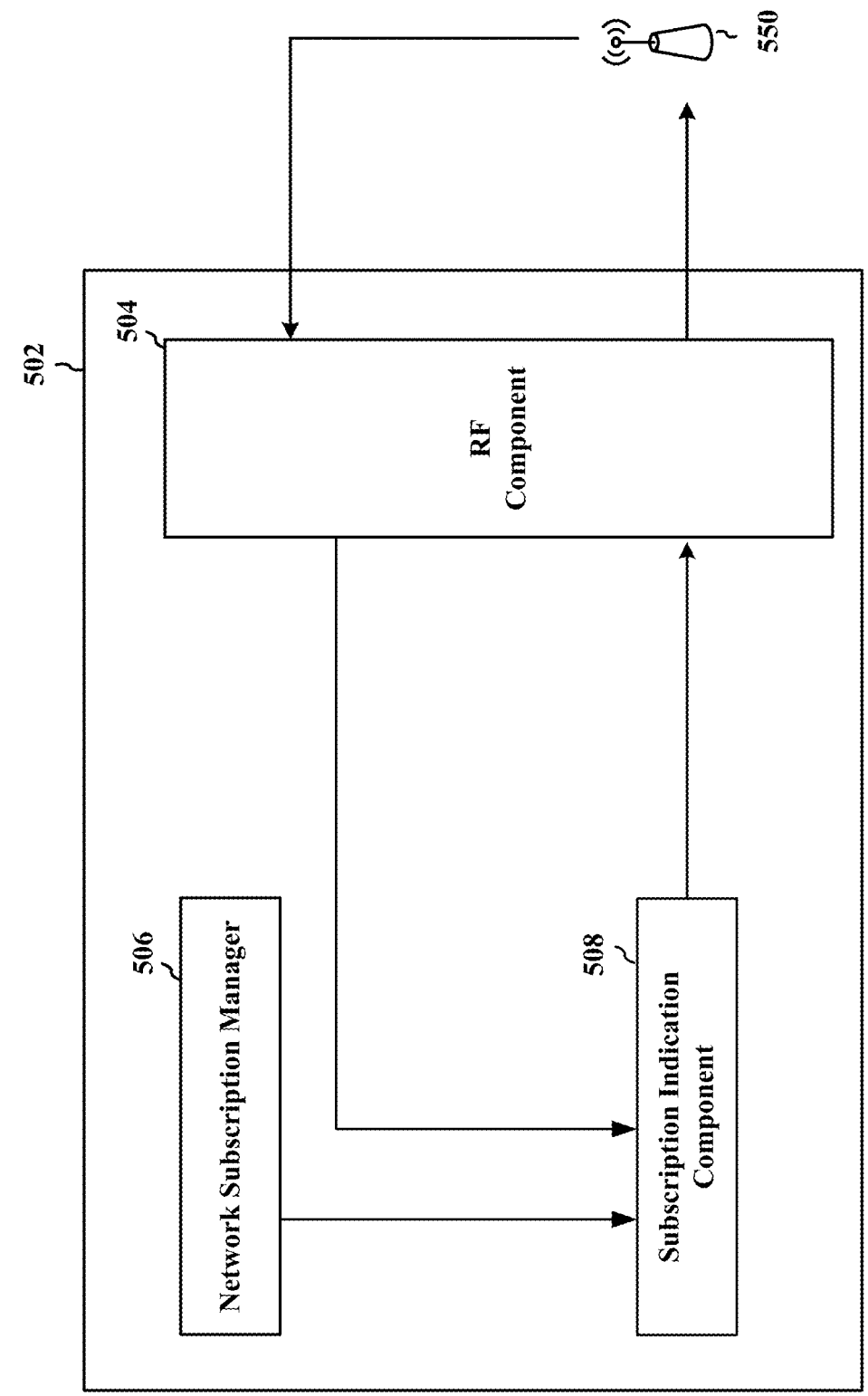
FIG. 5 is a conceptual data flow diagram illustrating the data flow between different means/components according to some embodiments.

FIG. 5 is a conceptual data flow diagram 500 illustrating the data flow between different means/components in an exemplary apparatus 502. The apparatus may be a UE. The apparatus includes an RF component 504, Network Subscription Manager 506, and Subscription Indication Component 58. RF component 504 receives control and user data from a base station 550. The control data may include, for example, SSBs, paging transmissions, SIM State Queries, and uplink grants. Network Subscription Manager 506 monitors the active network subscription at apparatus 502. Subscription Manager 506 may provide Subscription Indication Component 508 of the active status of the network subscriptions at the apparatus 502. Subscription Indication Component 508 may transmit a subscription indication to the base station 550 via RF component 502, in response to queries or uplink grants from the base station 550.

The apparatus may include additional components that perform each of the blocks of the algorithm in the aforementioned flowcharts of FIG. 3. As such, each block in the aforementioned flowcharts of FIG. 3 may be performed by a component and the apparatus may include one or more of those components. The components may be one or more hardware components specifically configured to carry out the stated processes/algorithms, implemented by a processor configured to perform the stated processes/algorithms, stored within a computer-readable medium for implementation by a processor, or some combination thereof.

Figure 6:
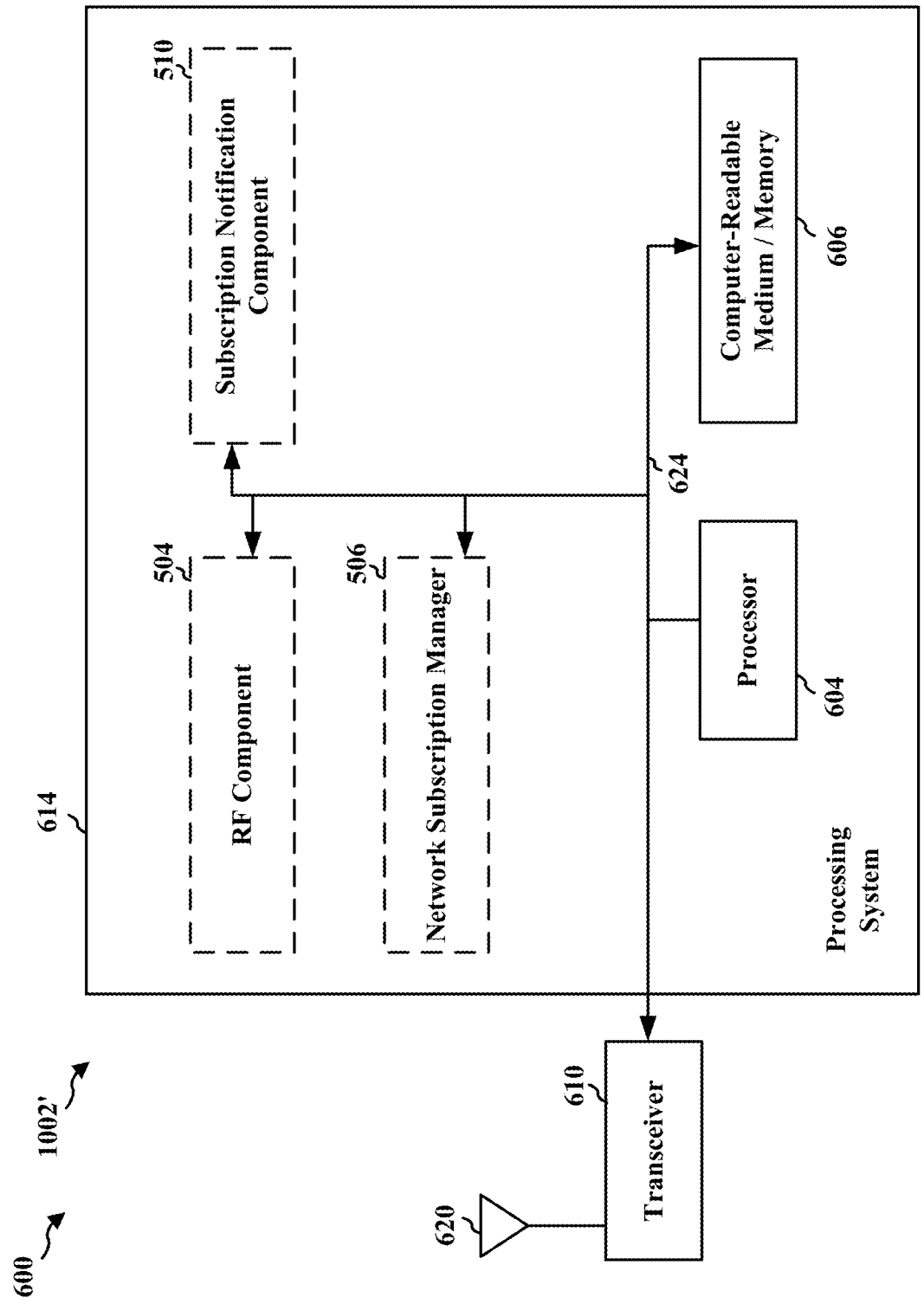
FIG. 6 is a diagram illustrating an example of a hardware implementation for an apparatus employing a processing system according to some embodiments.

FIG. 6 is a diagram 600 illustrating an example of a hardware implementation for an apparatus 602' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, RF component 504, data processing component 506, location indication component 508, subscription indication component 510, and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614. In addition, the transceiver 610 receives information from the processing system 614, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, and 508. The components may be software components running in the processor 604, resident/stored in the computer readable medium/memory 606, one or more hardware components coupled to the processor 604, or some combination thereof. The processing system 614 may be a component of the UE 250 and may include the memory 260 and/or at least one of the TX processor 268, the RX processor 256, and the controller/processor 259.

In one configuration, the apparatus 502/502' for wireless communication includes means for determining that the UE is associated with one or more network subscriptions; and means for transmitting a subscription indication to a network device, wherein the subscription indication identifies a subscription status of the UE to the network. The aforementioned means may be one or more of the aforementioned components of the apparatus 502 and/or the processing system 614 of the apparatus 502' configured to perform the functions recited by the aforementioned means. As described supra, the processing system 614 may include the TX Processor 268, the RX Processor 256, and the controller/processor 259. As such, in one configuration, the aforementioned means may be the TX Processor 268, the RX Processor 256, and the controller/processor 259 configured to perform the functions recited by the aforementioned means.

Figure 7:
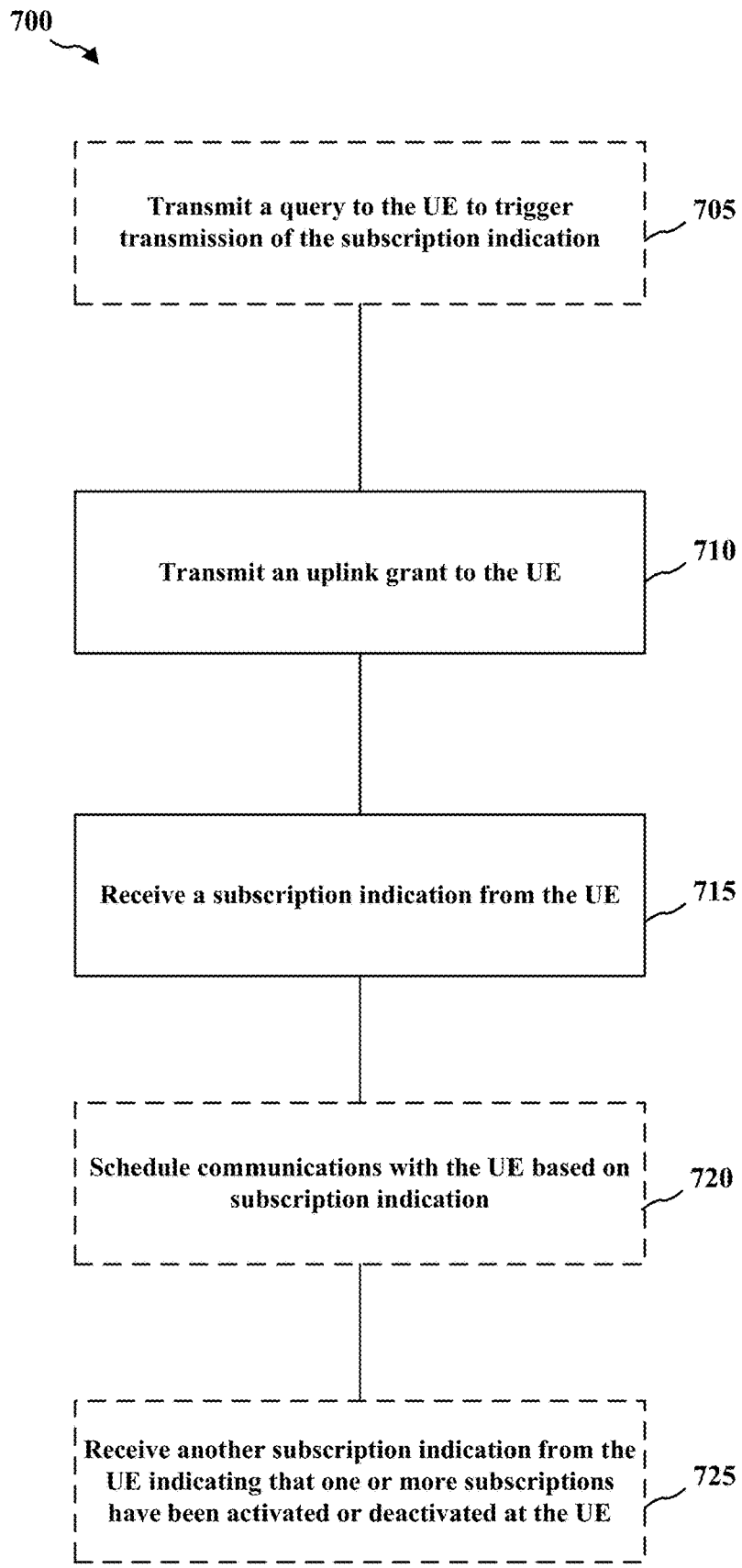
FIG. 7 is a flowchart of a method of wireless communication according to some embodiments.

FIG. 7 is a flowchart 700 of a method of wireless communication. The method may be performed by a base station or network (e.g., the BS 102, 210, 304; the apparatus 802/802'; network MME 162). Optional aspects are illustrated with a dashed line. The method improves communication with a MSIM device by enabling a reduction in power consumption and overhead signaling.

At 705, the BS may transmit a query to the UE to trigger a transmission of a subscription indication. For example, as illustrated at 310 in FIG. 3, the base station may transmit a SIM State Query to the UE. The SIM State Query may be transmitted as a MAC CE. Alternatively, the query may be transmitted in a DCI or RRC IE.

At 710, the base station may transmit an uplink grant to a UE. For example, as illustrated at 315 in FIG. 3, the base station may transmit an uplink grant to the UE. The uplink grant may or may not be transmitted concurrently in the same slot as the uplink grant.

At 715, the BS may receive the subscription indication from the UE. For example, as illustrated at 320 in FIG. 3, the base station may receive a SIM State Response from the UE. The SIM State Response may be transmitted as a MAC CE. Alternatively, the subscription indication may be transmitted in a DCI or RRC IE. Additionally, the subscription indication may indicate whether a plurality of active subscriptions are associated with a same radio access network or different radio networks. The subscription indication may indicate UE status including at least one of Single-SIM, Dual-SIM Dual-Standby, or Dual-Sim Dual-Active.

At 720, the BS may schedule communications with the UE based on the subscription indication. For example, as illustrated at 315 in FIG. 3, the base station may schedule UE communication, such as PDSCH, based on the SIM State Response. For example, the base station may not schedule PDSCH on SSB slots. Additionally, the base station may schedule periodic gaps in PDSCH transmissions to allow the UE to monitor for pages on a different network or frequency.

At 725, the BS may receive another subscription indication from the UE indicating that one or more subscriptions have been activated or deactivated at the UE. For example, as illustrated at 330 and 335 in FIG. 3, the base station may receive a subsequent SIM State Response indicating a change in the UE SIM State.

Figure 8:
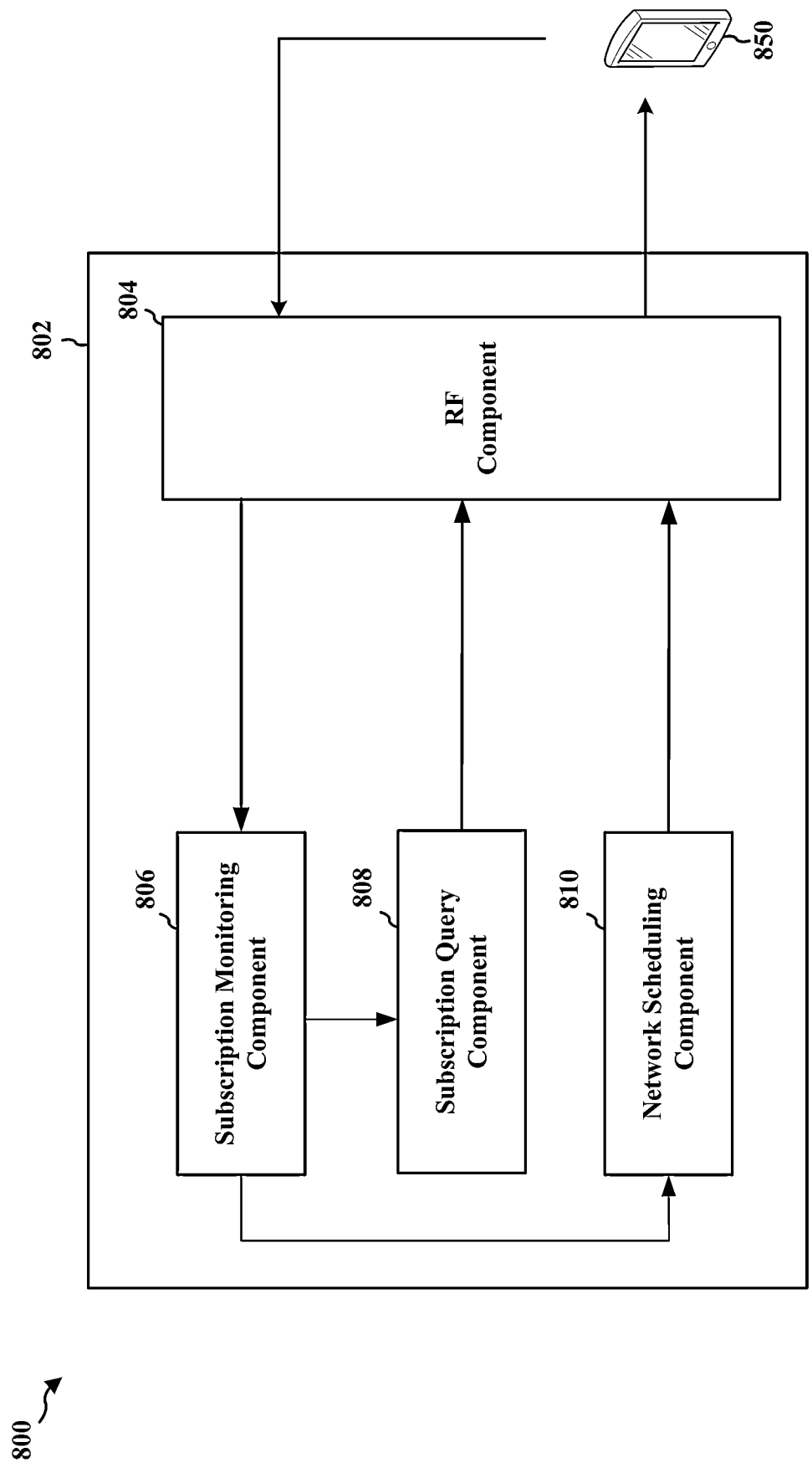
FIG. 8 is a conceptual data flow diagram illustrating the data flow between different means/components according to some embodiments.

FIG. 8 is a conceptual data flow diagram 800 illustrating the data flow between different means/components in an exemplary apparatus 802. The apparatus may be a base station. The apparatus includes a RF component 804, Subscription Monitoring Component 806, Subscription Query Component 808, and Network Scheduling Component 810. RF component 804 transmits and receives control and user data to and from UE 850. Subscription Monitoring Component 806 receives subscription indication signaling from UE 850 and monitors the UE SIM State. Subscription Query Component 808 may Query UE 850 for a SIM State Response. Subscription Query Component 808 may query the UE periodically, based on a timer, based on channel statistics, or based on UE behavior (such as failure to acknowledge transmission during SSB transmission). Network Scheduling Component 810 may schedule UE communication based on UE buffer status and the SIM State of the UE.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithms, implemented by a processor configured to perform the stated processes/algorithms, stored within a computer-readable medium for implementation by a processor, or some combination thereof.

Figure 9:
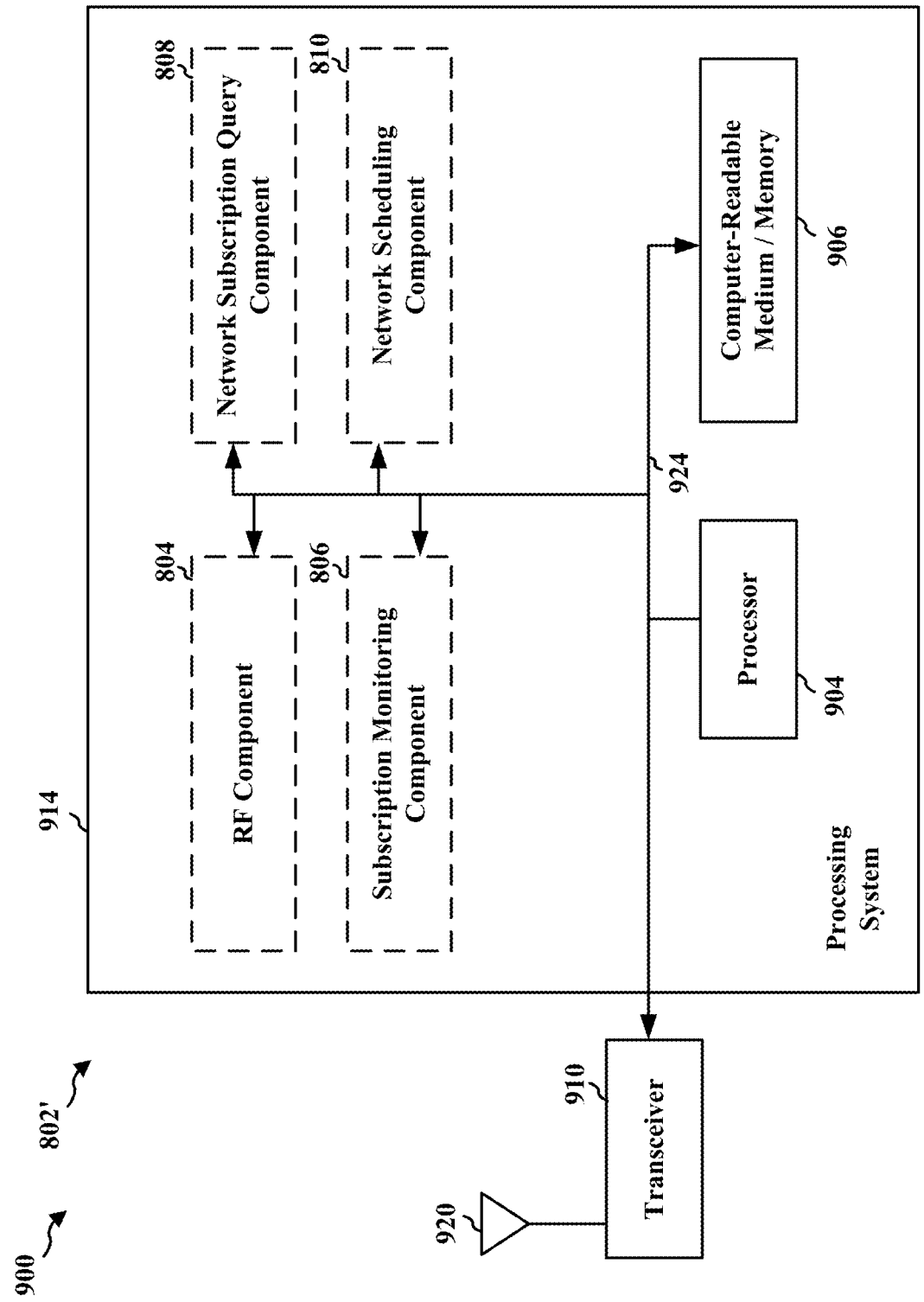
FIG. 9 is a diagram illustrating an example of a hardware implementation for an apparatus employing a processing system according to some embodiments

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, and the computer-readable medium/memory 906.

The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914. In addition, the transceiver 910 receives information from the processing system 914, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer readable medium/memory 906, one or more hardware components coupled to the processor 904, or some combination thereof. The processing system 914 may be a component of the base station 210 and may include the memory 276 and/or at least one of the TX processor 216, the RX processor 270, and the controller/processor 275.

In one configuration, the apparatus 802/802' for wireless communication includes means for transmitting an uplink grant to a user equipment (UE); and means for receiving a subscription indication from the UE, wherein the subscription indication identifies a current SIM state of the UE to the network. The aforementioned means may be one or more of the aforementioned components of the apparatus 802 and/or the processing system 914 of the apparatus 802' configured to perform the functions recited by the aforementioned means. As described supra, the processing system 914 may include the TX Processor 216, the RX Processor 270, and the controller/processor 275. As such, in one configuration, the aforementioned means may be the TX Processor 216, the RX Processor 270, and the controller/processor 275 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), comprising:
   determining that the UE is associated with one or more network subscriptions;
   determining a subscriber identity module (SIM) state based on the one or more network subscriptions;
   receiving, in a first medium access control (MAC) control element (CE), a query from a network device to trigger transmission of a subscription indication identifying the SIM state of the UE; and transmitting, in a second MAC CE, the subscription indication to the network device.

2. The method of claim 1,
wherein receiving the query comprises:
receiving an uplink grant, wherein the uplink grant includes the query, and
wherein transmitting the subscription indication comprises:
transmitting the subscription indication in response to the uplink grant.

3. The method of claim 1, wherein the UE transmits the subscription indication in response to an activation or deactivation of a network subscription.

4. The method of claim 3, further comprising determining, for each subscription of the one or more network subscriptions, whether to transmit the subscription indication based on whether a given network subscription corresponds to a same network as another network subscription from the one or more network subscriptions.

5. The method of claim 1, wherein the SIM state includes at least one of Single-SIM, Dual-SIM-Dual-Standby, or Dual-SIM-Dual-Active.

6. The method of claim 1, wherein the subscription indication comprises an octet of the second MAC CE.

7. The method of claim 1, further comprising:
determining that the one or more network subscriptions have been activated or deactivated at the UE; and
transmitting another subscription indication to the network device in response to the determining that the one or more network subscriptions have been activated or deactivated at the UE.

8. The method of claim 1, wherein the query is combined in a single message with an uplink grant.

9. A method of wireless communication at a network device, comprising:
transmitting an uplink grant to a user equipment (UE);
receiving, in a medium access control (MAC) control element (CE), a subscription indication from the UE, wherein the subscription indication identifies a subscriber identity module (SIM) state of the UE, wherein the MAC CE includes a logical channel identifier containing a value corresponding to the SIM state of the UE, the value being one of a first value for Single-SIM, a second value for Dual-SIM-Dual-Standby, or a third value for Dual-SIM-Dual-Active; and
scheduling communication with the UE based on the SIM state of the UE.

10. The method of claim 9, further comprising transmitting a query to the UE to trigger transmission of the subscription indication from the UE.

11. The method of claim 9, wherein the uplink grant is transmitted to trigger the UE to send the subscription indication.

12. The method of claim 9, wherein the subscription indication indicates an activation or deactivation of a network subscription at the UE.

13. The method of claim 12, wherein the subscription indication from the UE indicates whether a plurality of active subscriptions are associated with a same radio access network.

14. The method of claim 9, further comprising:
receiving another subscription indication from the UE indicating that one or more subscriptions have been activated or deactivated at the UE.

15. The method of claim 9, wherein the subscription indication occupies an octet in the MAC CE.

16. The method of claim 9, wherein the uplink grant corresponds to a SIM State Query, wherein the SIM State Query is transmitted as a radio resource control (RRC) Information Element (IE) or a downlink control information (DCI) to trigger transmission of the subscription indication.

17. The method of claim 9, wherein the UE is a single receiver-DSDS device comprising single receiver capability.

18. An apparatus for wireless communication, comprising:
a memory; and
at least one processor coupled to the memory and configured to:
determine that a user equipment (UE) is associated with one or more network subscriptions;
determine a subscriber identity module (SIM) state based on the one or more network subscriptions;
receive, in a first medium access control (MAC) control element (CE), a query from a network device to trigger transmission of a subscription indication identifying the SIM state of the UE; and
transmit, in a second MAC CE, the subscription indication to the network device.

19. The apparatus of claim 18,
wherein receiving the query comprises:
receiving an uplink grant, wherein the uplink grant includes the query, and
wherein transmitting the subscription indication comprises:
transmitting the subscription indication in response to the uplink grant.

20. The apparatus of claim 18, wherein the UE transmits the subscription indication in response to an activation or deactivation of a network subscription.

21. The apparatus of claim 18, wherein the SIM state includes at least one of Single-SIM, Dual-SIM-Dual-Standby, or Dual-SIM-Dual-Active.

22. The apparatus of claim 18, wherein the query is combined in a single message with an uplink grant.

23. An apparatus for wireless communication, comprising:
a memory; and
at least one processor coupled to the memory and configured to:
transmit an uplink grant to a user equipment (UE);
receive, in a medium access control (MAC) control element (CE), a subscription indication from the UE, wherein the subscription indication identifies a subscriber identity module (SIM) state of the UE, wherein the MAC CE includes a logical channel identifier containing a value corresponding to the SIM state of the UE, the value being one of a first value for Single-SIM, a second value for Dual-SIM-Dual-Standby, or a third value for Dual-SIM-Dual-Active; and
schedule communication with the UE based on the SIM state of the UE.

24. The apparatus of claim 23, wherein the at least one processor is further configured to transmit a query to the UE to trigger transmission of the subscription indication from the UE.

25. The apparatus of claim 23, wherein the uplink grant is transmitted to trigger the UE to send the subscription indication.

26. The apparatus of claim 23, wherein the subscription indication indicates an activation or deactivation of a network subscription at the UE.

27. The apparatus of claim 26, wherein the subscription indication from the UE indicates whether a plurality of active subscriptions are associated with a same radio access network.

28. The apparatus of claim 23, wherein the at least one processor is further configured to receive another subscription indication from the UE indicating that one or more subscriptions have been activated or deactivated at the UE.

29. The apparatus of claim 23, wherein the uplink grant corresponds to a SIM State Query, wherein the SIM State Query is transmitted as a radio resource control (RRC) Information Element (IE) or a downlink control information (DCI) to trigger transmission of the subscription indication.

30. The apparatus of claim 23, wherein the apparatus comprises a single receiver-DSDS device with single receiver capability.

* * * * *